(12) United States Patent  
Pope et al.

(10) Patent No.: US 7,495,558 B2  
(45) Date of Patent: Feb. 24, 2009

(54) SHELF-LIFE MONITORING SENSOR-TRANSPONDER SYSTEM

(75) Inventors: Gary Pope, Calabasas, CA (US); Therese E. Myers, Oxnard, CA (US); Stanton Kaye, Oxnard, CA (US); Jonathan Burchell, Toppesfield (GB)

(73) Assignee: Infratab, Inc., Oxnard, CA (US)

( * ) Notice: Subject to any disclaimer, the term of this patent is extended or adjusted under 35 U.S.C. 154(b) by 124 days.

(21) Appl. No.: 11/112,718

(22) Filed: Apr. 22, 2005

(65) Prior Publication Data

US 2005/0248455 A1    Nov. 10, 2005

Related U.S. Application Data

(60) Provisional application No. 60/566,019, filed on Apr. 27, 2004.

(51) Int. Cl.
- G08B 13/14 (2006.01)
- H04Q 5/22 (2006.01)
- B60Q 1/00 (2006.01)

(52) U.S. Cl. .............. 340/572.1; 340/309.16; 340/10.1; 340/457; 340/457.4; 235/385

(58) Field of Classification Search ............. None  
See application file for complete search history.

(56) References Cited

U.S. PATENT DOCUMENTS

| | | |
|---|---|---|
| 3,967,579 A | 7/1976 | Seiter |
| 4,057,029 A | 11/1977 | Seiter |
| 4,277,974 A | 7/1981 | Karr |
| 4,384,288 A | 5/1983 | Walton |
| 4,388,524 A | 6/1983 | Walton |
| 4,546,241 A | 10/1985 | Walton |
| 4,580,041 A | 4/1986 | Walton |
| 4,746,823 A | 5/1988 | Lee |
| 4,823,108 A | 4/1989 | Pope |
| 4,857,893 A | 8/1989 | Carroll |
| 4,868,525 A | 9/1989 | Dias |
| 5,193,056 A | 3/1993 | Boes |
| 5,214,409 A | 5/1993 | Beigel |
| 5,237,669 A | 8/1993 | Spear et al. |
| 5,367,658 A | 11/1994 | Spear et al. |

(Continued)

FOREIGN PATENT DOCUMENTS

EP    0 837 412 A2    4/1998

OTHER PUBLICATIONS

Michael E. Raynor, RFID and Distruptive Innovation, RFID Journal, Oct. 2004, pp. 27-42.

(Continued)

*Primary Examiner*—Julie Lieu  
(74) *Attorney, Agent, or Firm*—DLA Piper LLP (US)

(57) ABSTRACT

A perishable integrity indicator system includes a RFID transponder and a perishable integrity sensor. The RFID transponder includes a RF integrated circuit coupled with an antenna. The sensor monitors the time and temperature of the perishable. A freshness determining module receives time- and temperature-dependent measurement data from the perishable integrity sensor and determines a current freshness status. A communications interface to the RFID transponder permits a RFID reader to retrieve current freshness status data corresponding to the freshness status determined by the freshness determining module. The system further includes a power management module.

78 Claims, 9 Drawing Sheets

U.S. PATENT DOCUMENTS

| | | |
|---|---|---|
| 5,430,441 A | 7/1995 | Bickley et al. |
| 5,442,669 A | 8/1995 | Medin |
| 5,491,482 A | 2/1996 | Dingwall et al. |
| 5,519,381 A | 5/1996 | Marsh et al. |
| 5,528,222 A | 6/1996 | Moskowitz et al. |
| 5,563,928 A | 10/1996 | Rostoker et al. |
| 5,564,926 A | 10/1996 | Branemark |
| 5,572,169 A | 11/1996 | Iwamoto |
| 5,640,687 A | 6/1997 | Meron et al. |
| 5,649,295 A | 7/1997 | Shober et al. |
| 5,745,036 A | 4/1998 | Clare |
| 5,802,015 A | 9/1998 | Rothschild et al. |
| 5,809,518 A | 9/1998 | Elliott et al. |
| 5,835,553 A | 11/1998 | Suzuki |
| 5,847,705 A | 12/1998 | Pope |
| 5,850,187 A | 12/1998 | Carrender et al. |
| 5,963,105 A | 10/1999 | Nguyen |
| 5,963,134 A | 10/1999 | Bowers et al. |
| 6,003,115 A | 12/1999 | Spear et al. |
| 6,006,247 A | 12/1999 | Browning et al. |
| 6,012,057 A | 1/2000 | Mayer et al. |
| 6,023,712 A | 2/2000 | Spear et al. |
| 6,025,780 A | 2/2000 | Bowers et al. |
| 6,094,138 A | 7/2000 | Eberhardt et al. |
| 6,100,804 A | 8/2000 | Brady et al. |
| 6,112,275 A | 8/2000 | Curry et al. |
| 6,116,505 A | 9/2000 | Withrow |
| 6,122,704 A | 9/2000 | Hass et al. |
| 6,147,605 A | 11/2000 | Vega et al. |
| 6,160,458 A | 12/2000 | Cole et al. |
| 6,217,213 B1 | 4/2001 | Curry et al. |
| 6,232,870 B1 | 5/2001 | Garber et al. |
| 6,275,779 B1 | 8/2001 | Pohle et al. |
| 6,285,282 B1 | 9/2001 | Dorenbosch et al. |
| 6,294,997 B1 * | 9/2001 | Paratore et al. .......... 340/572.1 |
| 6,326,892 B1 | 12/2001 | De La Forterie |
| 6,351,406 B1 | 2/2002 | Johnson et al. |
| 6,376,284 B1 | 4/2002 | Gonzalez et al. |
| 6,476,682 B1 | 11/2002 | Cole et al. |
| 6,476,716 B1 | 11/2002 | Ledlow |
| 6,545,938 B2 | 4/2003 | Lee et al. |
| 6,593,845 B1 | 7/2003 | Freedman et al. |
| 6,671,358 B1 | 12/2003 | Seidman et al. |
| 6,712,276 B1 * | 3/2004 | Abali et al. .................. 235/492 |
| 6,720,866 B1 | 4/2004 | Sorrells et al. |
| 6,795,376 B2 | 9/2004 | Quine |
| 6,806,698 B2 | 10/2004 | Gauthier et al. |
| 6,826,119 B2 | 11/2004 | Fortune |
| 6,857,566 B2 | 2/2005 | Wankmueller |
| 6,860,422 B2 | 3/2005 | Hull et al. |
| 6,863,377 B2 | 3/2005 | Walker et al. |
| 6,950,028 B2 | 9/2005 | Zweig ........................ 340/588 |
| 2002/0085453 A1 | 7/2002 | Fortune |
| 2004/0212509 A1 | 10/2004 | Zweig ........................ 340/588 |
| 2007/0001862 A1 * | 1/2007 | Zweig ........................ 340/588 |

OTHER PUBLICATIONS

Ann Grackin, A Midsize Approach to FRID, RFID Journal, Oct. 2004, p. 43.

* cited by examiner

SHELF-LIFE MONITORING SENSOR-TRANSPONDER SYSTEM

PRIORITY

This application claims the benefit of priority to U.S. provisional patent application No. 60/566,019, filed Apr. 27, 2004, which is hereby incorporated by reference.

BACKGROUND

1. Field of the Invention

The invention relates to RF smart labels and sensors, software and processes particularly for monitoring and analyzing the shelf life of a perishable product.

2. Description of the Related Art

Perishable products, such as chilled and minimally processed food products, vaccines, pharmaceuticals, blood, film, chemicals, adhesives, paint, munitions, batteries, soft drinks, beer, cosmetics and many other products, each have a unique shelf life. Product quality is affected by a number of factors that may be physical, chemical or biological in nature, and that act together in often complex and interconnected ways. However, temperature is usually the predominant factor determining the longevity of quality. It is desired to accurately monitor and analyze this "shelf life" or perishability.

Today the date stamp, whether it is "use-by", "sell-by" or "closed" (special number on the product which only the product manufacturer understands), is the product producer's rule of thumb or "best guess" of the quality of a product—in terms of taste, texture, aroma, appearance and more. When a product is used or eaten after this date, its quality may be less than what the product manufacturer wants you, its customer, to experience.

Product dates are based on the product manufacturer's best assessment of the temperature to be experienced by the perishable, from the time it leaves the plant until it is acquired by the user. Because temperature is often different from what was predicted, the date alone is not always an accurate representation of shelf life. If a product is properly transported and stored, it can last much longer than the date. Conversely, if the temperature is higher than predicted, the product deteriorates more quickly in relation to temperature. A "dead date" is simply typically ascribed to a product, as if only time played a role in the spoilage of a product, or as if the product spoilage rate was independent of temperature. However, it is well known that many products spoil far more slowly when they are refrigerated, than when they are stored at room temperature. Once a "dead date" is applied conventionally to a product, it cannot be changed to reflect what has happened to the product.

In a product supply chain, the use of RF transponders (also known as RFID or radio frequency identification) has grown in use as a result of the establishment of RF frequency and data format standardization by ISO and EPCglobal for tracking and tracing of products. Additionally the wide use of Bluetooth and Zigbee (other RF-based communication interfaces) has resulted in additional inexpensive RF input and output options for active monitoring of products. At the same time, advances in digital sensing have made possible low cost sensors for monitoring certain conditions of products, especially temperature, humidity, vibration and shelf life (integration of time and temperature).

SUMMARY OF THE INVENTION

The combination of digital sensing and RF for input and output of sensing data makes possible a new class of sensors, including sensors that monitor and report the integrity of a product, (e.g. how well the quality of the product has been maintained over time). It is desired to have a system that utilizes RF technology for the communication of precision, temperature-dependent shelf-life and other time-dependent sensor monitoring of perishable products.

A perishable integrity indicator system is provided in accordance with the invention that includes a RFID transponder and a perishable integrity sensor. The RFID transponder includes a RF integrated circuit coupled with an antenna. The sensor monitors the time and temperature of the perishable. A freshness determining module receives time- and temperature-dependent measurement data from the perishable integrity sensor and determines a current freshness status. A communications interface to the RFID transponder permits a RFID reader to retrieve current freshness status data corresponding to the freshness status determined by the freshness determining module. The system further includes a power management module.

According to one aspect of the invention, a memory module contains data representing one or more predefined temperature-dependent shelf-life trends. The freshness determining module determines the current freshness status by applying the measurement data to the trend data from the memory module.

According to another aspect, one or more memory media contain a RFID transponder program portion for controlling the RFID transponder, and a dedicated sensor data portion that contains the freshness status data, or special commands for retrieving the data, or a combination thereof. The data is directly accessible by a RF reader without disturbing the sensor.

In a further aspect, the power management module periodically wakes up the freshness monitoring component from a sleep or other low power state to gather the sensor measurements.

In a further aspect, a system for monitoring perishable integrity over multiple segments of product supply chain includes multiple perishable integrity indicator systems configured for transferring freshness status data from at least a first indicator system to a second indicator system.

According to another aspect, the freshness status data includes a shelf life log that tracks time at fractions of shelf life lost.

In a further aspect, a custody log tracks information relating to multiple custody periods over a perishable product's shelf life.

Other features are described and claimed below and/or are apparent from the drawings.

DETAILED DESCRIPTION OF THE PREFERRED EMBODIMENTS

Preferred and alternative embodiments are described below relating to RF smart labels and sensors, software and processes particularly for monitoring and analyzing the shelf life of a perishable product. The described sensors and sensors act as "live" dates that tell consumers if a product is fresh and that alert supply chain managers with calls to action before perishables become "unsaleable". When these sensors are used in RFID supply chain systems, the software preferably adds "Least Shelf Life Left" logistics and inventory management to RFID tracking and tracing of products.

Thermal Dependence of Shelf Life

In 1889 a Swedish chemist, Svante August Arrhenius, characterized the dependence of chemical, biological or mechanical reactions on temperature as an equation. Perishable producers all do their own calculations and have their own criteria for a product's shelf life. Spoilage curves having Arrhenius kinetics as a starting point are utilized in a RFID sensor apparatus in accordance with a preferred embodiment.

Figure 1:
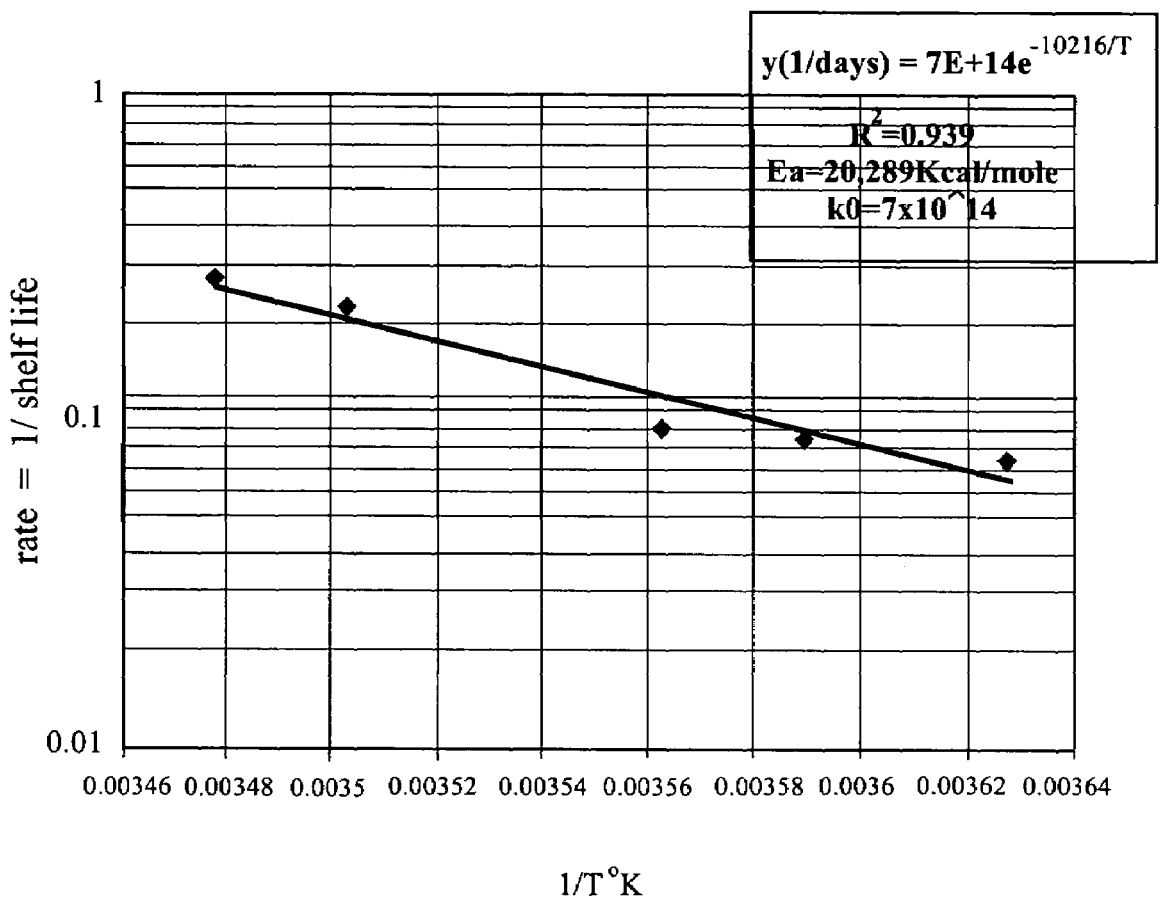
FIG. 1 is an exemplary Arrhenius plot of spoilage rate a function of inverse temperature.

Referring to FIG. 1, a plot of the natural logarithm of spoilage rate versus inverse temperature is illustrated. As shown, the spoilage rate exponentially falls in proportion with increasing inverse temperature. The equation itself follows: Spoilage rate $(1/time)=A+Be^{-C/Temperature}$ Other expressions of continuous temperature-dependent spoilage rate curves may be used that preferably non-linear. The sensor is preferably configured to periodically measure one or more average or estimated temperatures over a time period since a previous measurement. From these one or more temperatures, a spoilage is determined, e.g., from a table of data based on the plot shown in FIG. 1. The spoilage rate is applied to the time over which it was determined to apply, and in conjunction with previous measurements, a determination is made as to whether the product remains fresh.

The sensor monitors temperature, integrates it over time while referencing a data table containing the shelf life parameters for the tagged product, as may be previously provided or understood by a perishable producer. These shelf life parameters are shelf life calculations based upon Arrhenius equations with additional refinements, depending upon the quality concerns of the perishable producer. The result is a customized, product-specific, real-time indicator of shelf life left and shelf life history.

In accordance with a preferred embodiment, temperature-dependent monitoring of shelf life may utilize twin clocks as described in U.S. Pat. No. 5,442,669, "Perishable Good Integrity Indicator," Aug. 15, 1995, assigned to Infratab, Inc., which describes a method of using oscillators and a data table to determine a shelf life of a product. A temperature-dependent clock and a temperature independent clock are used to determine the absolute time and the average or estimated temperature over temporal periods during the shelf-life of a product.

The use of data tables in the preferred embodiment enable the shelf life calculations that are linear, exponential or do not conform at all to Arrhenius equations, for example for products such as bio-medical and industrial adhesives, whose spoilage rates are different at frozen temperature ranges, whose shelf life is influenced by prior temperature history or whose shelf life spoilage rates are different at different humidity ranges. Additionally the data tables allow user fine-tuning of selected temperature ranges.

Transponder-Sensor Configurations

Figure 2:
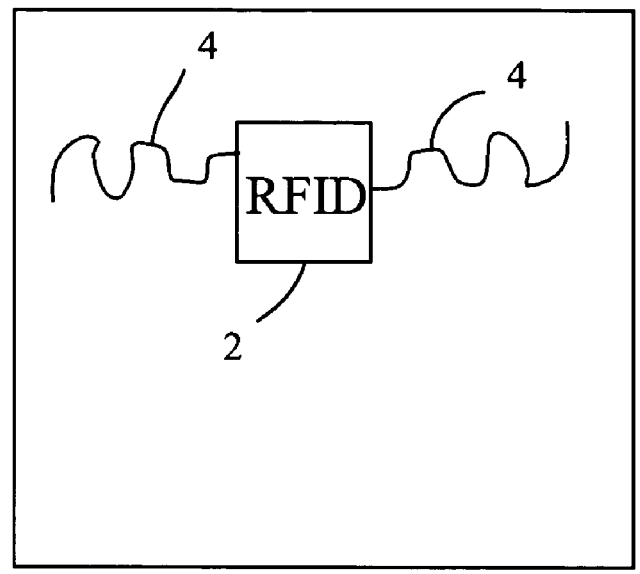
FIG. 2 schematically illustrates a conventional passive RFID sensor.

A convention RFID sensor is illustrated at FIG. 2 including a RFID chip 2 and an antenna 4. The sensor illustrated at FIG. 2 is energized electromagnetically by an RFID reader pointed at the sensor.

Figure 3:
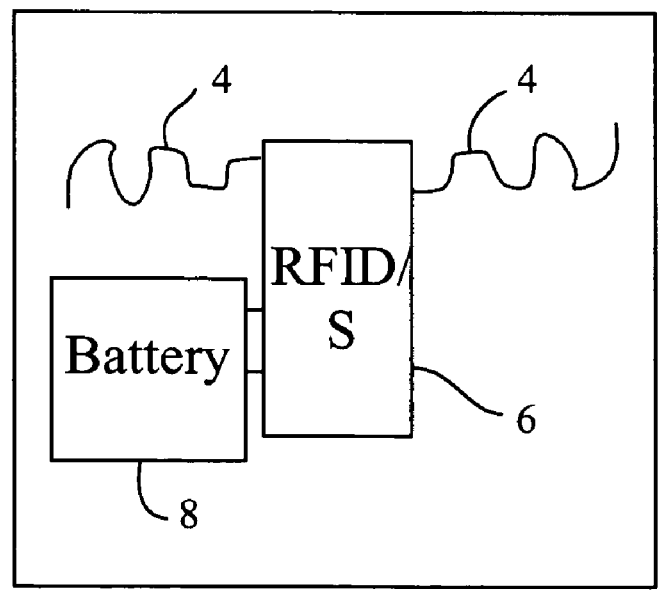
FIG. 3 schematically illustrates an active RF/sensor including a battery in accordance with a first embodiment.

FIG. 3 schematically illustrates an active RF/sensor sensor including a battery in accordance with a first embodiment. A chip 6 having RFID and sensor components is energized by a battery 8 that is resident on the sensor. In each of the embodiments described with reference to FIGS. 1-12, the sensor is provided preferably in a substantially planer label attached to affected or perishable products that monitor the product integrity, usability and safety of a product or an environment in conjunction with a RF transponder or other radio frequency identification (RFID) system used to track and trace products or monitor an environment or in conjunction with an RF communication interface such as Bluetooth or Zigbee. In the case of perishable products, the sensors may include temperature, shelf life (the integration of time and temperature), humidity, vibration, shock and other sensors that determine how well the quality of a perishable has been maintained. In the case of non-perishable products, sensors may include the above mentioned sensors plus product specific sensors that monitor the wear and tear on a particular product.

Figure 4:
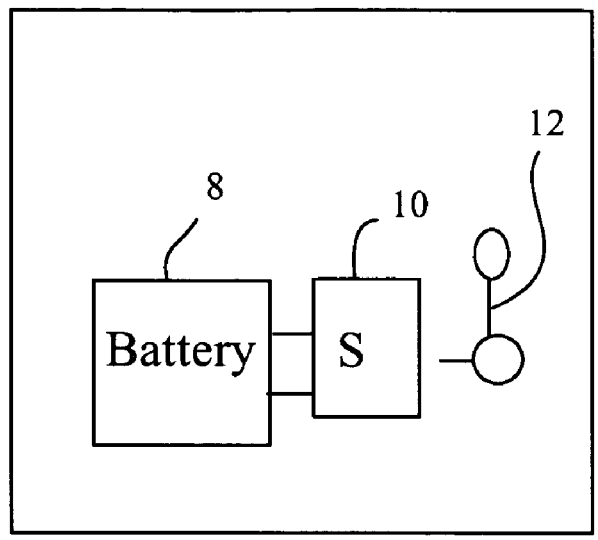
FIG. 4 schematically illustrates a sensor in accordance with a second embodiment including a battery, sensor and display switch.

FIG. 4 schematically illustrates a sensor in accordance with a second embodiment including a battery, sensor and display switch. The shelf-life sensor 10 is powered by a battery 8. A display/switch 12 is provided that is/are coupled to the sensor 10. The display/switch 12 includes a LED or other visual, audio or otherwise sensory indicator of the freshness of the product that is being monitored.

Figure 5:
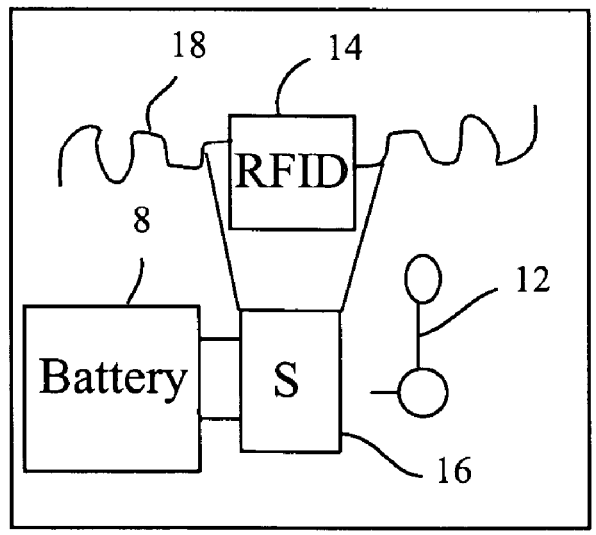
FIG. 5 schematically illustrates a semi-passive RF sensor having a direct sensor-to-antenna connection in accordance with a third embodiment.
Figure 6:
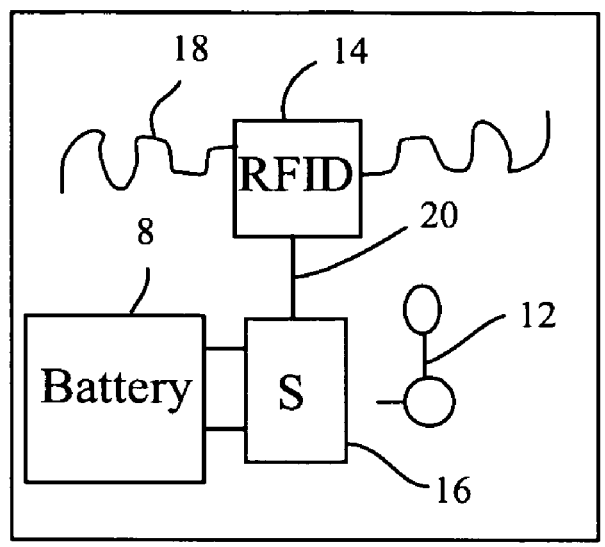
FIG. 6 schematically illustrates a semi-passive RF sensor having a serial interface between sensor and RFID components in accordance with a fourth embodiment.
Figure 7:
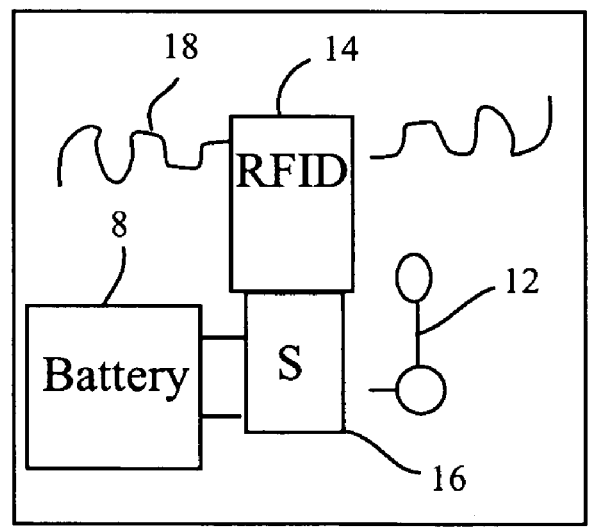
FIG. 7 schematically illustrates an active integrated sensor and RFID module in accordance with a fifth embodiment.

Referring now to FIGS. 5-7, a discrete sensor is coupled to an RF transponder 14 in each of these embodiments, and preferably exhibits the following two features. First, the transponder 14 has ability to connect an external sensor 16 via direct current to the transponder's antenna 18 or via a one- or two-wire interface 20 directly into the RF transponder 14. Second, at least 32 bits of user read/write memory is assigned exclusively to the sensor. This designated RF transponder memory is used by the sensor chip 16 to report sensor status and alerts and to send/receive sensor commands to/from a RF reader.

In the case of a multi-chip RF tag, the tag's circuit architecture supports a RFID transponder chip with support for either a direct current connection to the RF antenna (FIG. 5) or for a one- or two-wire serial interface to a sensor integrated circuit (FIGS. 6-7), and at least 32 bits of read/write user memory. One or more sensor integrated circuits provide sensing, sensing power management, sensing data memory management and RF detection/interface to the RFID transponder. The system preferably includes a battery for powering the sensor(s) and optionally enhancing communication signal when sensor data is sent to an RF reader, although the system may be passively configured. The battery also can be used to support the initiation of RF communication by the sensor.

The system includes a communication interface preferably having the following features. First, it is configured to provide notification to the sensor that data or commands are being sent by an RF reader or other RF device including another sensor. The notification may be provided from the RF transponder or from circuitry in the sensor that is watching the RF data for sensor commands. Second the interface is preferably configured with the ability for the sensor, as part of its sensing operation, to put sensor status and alert data into designated RF transponder memory. Third, the interface preferably has the ability for the sensor and the RF reader or other RF device to send/receive commands and data using designated RF transponder memory. Fourth, the interface has the ability for the sensor to by-pass the RF transponder memory and to establish a direct path from the RF reader to the sensor for the purpose of initial sensor configuration and for downloading sensor history.

Memory

The current RF transponder chip is preferably configured to address large amounts of memory (8 K bytes). For RF system performance reasons, the RF chip may actually be populated with as little as 8 to 256 bytes of physical memory. The RF reader's commands to the sensor chip may be the RF transponder's unpopulated memory addresses, or pseudo memory. This command syntax enables no modification to the RF reader for sensor support. Alternatively, the RF reader commands to the sensor can be special commands involving RF reader software that is modified to interpret the commands.

The RF transponder may be configured to ignore illegal commands. It may or may not issue an error message when it sees illegal commands. This enables the sensor commands sent by the reader to be placed in the designated memory area for the sensor.

It is preferred that the RFID sensor-transponder used as a label for tracking and tracing goods be inexpensive. As a result the transponder sensor may be powered by a remote RF reader or inexpensive battery and contain as little memory as possible, e.g., 64-2048 bits, even though the RFID chip may be capable of addressing up to 8 k bits of memory.

A shelf life monitoring design may include a two-chip system (FIGS. 5-6), or alternatively may include a single chip that exhibits two-functions within the chip (FIG. 7). A shelf life chip or module may be used to treat a RFID memory as an input/output pipe to an RF reader. Memory used for RFID applications is treated separately from shelf life memory. Shelf life memory may be accessed through one or more 32-bit blocks of the RF memory. In a two chip implementation, a shelf life chip may communicate to a RFID chip via serial interface over a 1-wire bus.

In order to make a shelf life memory more accessible and usable by an RF reader, shelf life memory addresses may be named based upon unused addresses in the RFID memory (i.e., memory addresses over 2048 bits to 8000 bits). When an RF reader sends an address over and above physical memory in the chip, the RFID chip routes the address to the shelf life memory. Data in this memory address on the shelf life chip is sent over the 1-wire bus to the 32-bit memory block on the RFID chip and then transmitted via radio frequency to the RF reader.

Although primarily shelf life monitoring is described herein, the shelf life chip may be designed to support multiple sensors, such as humidity or vibration. This sensor data is assigned these pseudo RF addresses, access to which is through the shelf life chip to the RF memory and out to the reader.

Power Management

The sensor 16 preferably performs its sensing operations at intervals specified by the user. As illustrated at FIGS. 3-7, the sensor is battery operated. To conserve battery power, the sensor 16 sleeps between sensing intervals. At the predetermined sensor interval, the sensor wakes up, acquires the sensor data and analyzes the sensor data to determine exception conditions. For example it preferably calculates the percentage of product life used for the time interval. The sensor 16 may determine that a threshold has been exceeded. The sensor then copies the results of its exception calculations/alerts to the RF transponder's memory and returns to sleep. This data is sent by the RF transponder to the RF reader or other RF device in accordance with its normal RF operations.

If the RF reader or other RF device requests more sensor information, it does so by sending commands to the RF transponder for the sensor. Advantageously, how the sensor is notified that the RF reader has or wants sensor data is dependent upon the physical interface between sensor and RF transponder. If the physical interface is via direct current from the antenna, the sensor watches for RF signals to the RF transponder, determines when a communication link between the attached RF transponder and RF reader has been established, determines when data has been written to the designated RF transponder memory and optionally determines if a special sensor command has been sent by the RF reader. If the physical interface is a one- or two-wire serial interface, the RF transponder notifies the sensor that the RF reader has or wants data.

When the sensor 16 has been notified of a request for data, it wakes up, and reads/writes the data requested into the RF transponder's memory. It then goes back to sleep.

There are situations when the amount of data sent or received is large, for example, when the RF reader loads sensor configuration data and history collection rules into the sensor 16 and when the sensor 16 has log and history data to be downloaded. In these situations the sensor interface allows sensor to by-pass the RF transponder's memory for sending or receiving blocks of data. The result is the establishment of a direct connection between the sensor 16 and the RF reader.

The system is preferably configured to sense, then summarize data in the sensor memory (shelf life % left, hi/lo temperature thresholds exceeded, time elapse exceeded), then look for exceptions by comparing the summary to conditions preconfigured by the user and finally to alert user that all is ok or not. This summary info and alerts uses very little memory, and immediately after the sensing, it is put into the RF memory as "quick alerts". Once quick alerts are in the RFID memory, they are read like any other RF data, even when the sensor is asleep or in an otherwise low power state. The sensor also keeps history for later use in insurance claims, which can be downloaded upon command by user.

The embodiments described herein generally relate to means for enabling a discrete sensor or multiple discrete sensors to be added onto, coupled with or piggyback attached to an RF transponder component for the purpose of communicating sensor data to and from remote RF computer devices and networks. A sensor communication interface is provided to an RF transponder for the purpose of communicating sensor alerts and history to an RF reader. A sensor architecture is provided for the management of sensor data. A method for physically mounting the sensor(s) onto an RF or RFID tag is also provided. Straightforward transition is enabled from discrete components to a combined sensor-RF integrated circuit, permitting sensor RF tags to be tested using discrete components until volume demands an integrated solution.

Further Transponder—Sensor Configurations

Figure 8A:
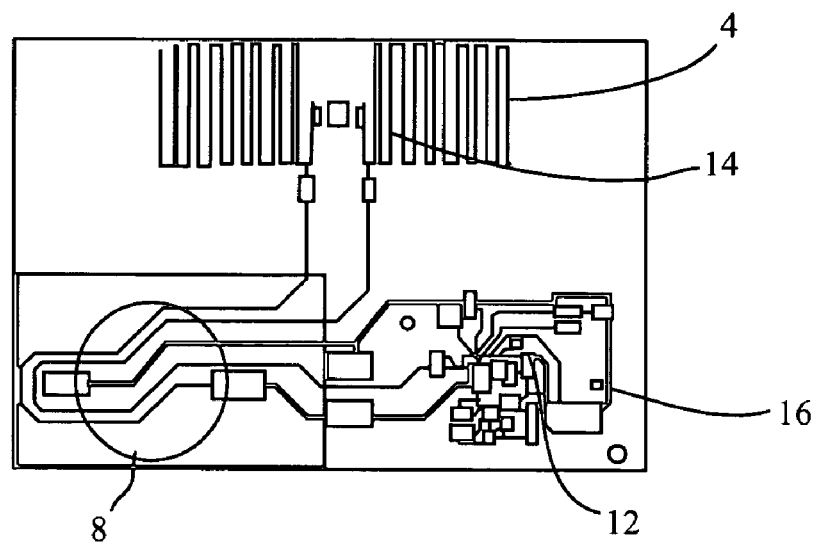
FIGS. 8A and 8B schematically illustrate components of RFID sensors in accordance with further embodiments.
Figure 8B:
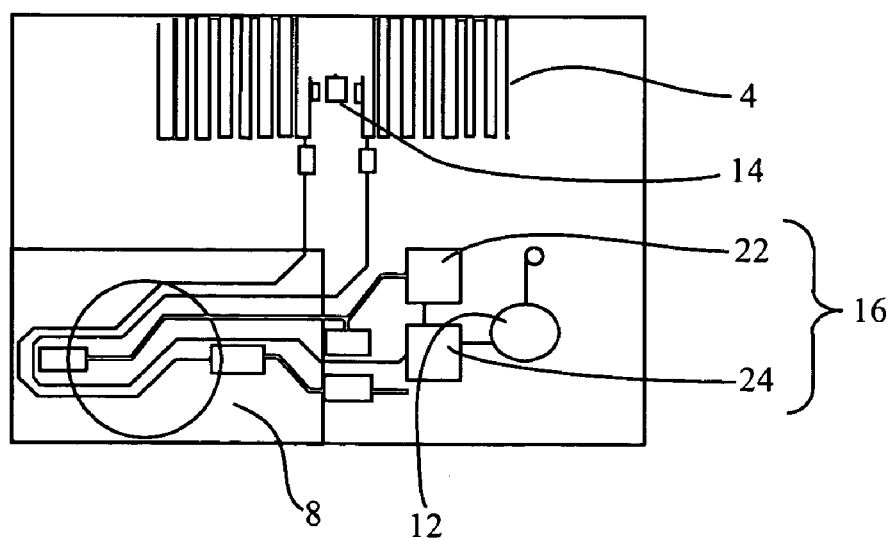

FIG. 8A-8B schematically illustrate a freshness tag in accordance with a preferred embodiment. The tag includes a RFID chip 14 coupled with an antenna 4 for communicating with a RFID reader. A battery 8 is included for energizing the tag permitting the tag to operate at times when a reader is not communicating with it. The battery 8 permits freshness monitoring and updating at selected times so that freshness status can be updated within the memory and at the display independent of reader interaction. The sensor chip 16 includes a sensor component 22 and logic 24. The sensor 16 periodically measures time and temperature and determines freshness based on past history and calculation based on spoilage rate tables or formulas. The freshness status is updated and stored in a memory location that is accessible by a RFID reader communicating with the RFID chip 14 independent of the sensor 16.

The described embodiments are advantageously configured in order for the RF transponder-sensor systems to be widely used and desired, as case and pallet tags. The transponder unit costs are minimized in one or more of the following ways. First, minimal memory is provided in the transponder component in order to optimize the read distance of transponder. Second, efficient power management is provided by battery control logic including the periodic monitoring capability of the sensor between sleep periods and the accessibility of the freshness data directly by RFID reader. Third, the system is general purpose in order to maximize RF unit volume and thus minimize unit cost. For an example, a memory size of EPC RFID UHF transponders used in the supply chain ranges from 64- or 96 bits for Class 0/! and 288-bits for Class 1 Gen2. In alternative embodiments, passive RF transponders may be used, wherein the power for the transponder is provided by a remote RF reader, with the RF reader's objective to keep power required by the RF transponder to a minimum. In the case of active (battery-powered) RF transponders, memory size of the transponder can be larger as the battery can be used to enhance the signal from RF tag to reader.

Sensors, in contrast, are dictated by needs of a particular product or class of product as to what sensors and what sensor data is to be collected, and what spoilage curves are obeyed by particular products. These can be either memory hungry (in order to store sensor data over the life of the product) or require computational capability to summarize and condense the sensing data. Sensors further utilize power management optimized around the sensing interval (not RF). Additionally, for sensors to be used for supply chain and logistics management, sensing data is evaluated and summarized in the tag with exception and alert conditions able to be communicated quickly to RF readers. History is kept in the tag for backup for insurance claims or for use in analysis of what went wrong. Additionally the sensor may be preferably configured prior to start of sensing with sensing and history logging rules, and other information too bulky to be part of real-time RF inventory logistics.

Programming and Data

Figure 9:
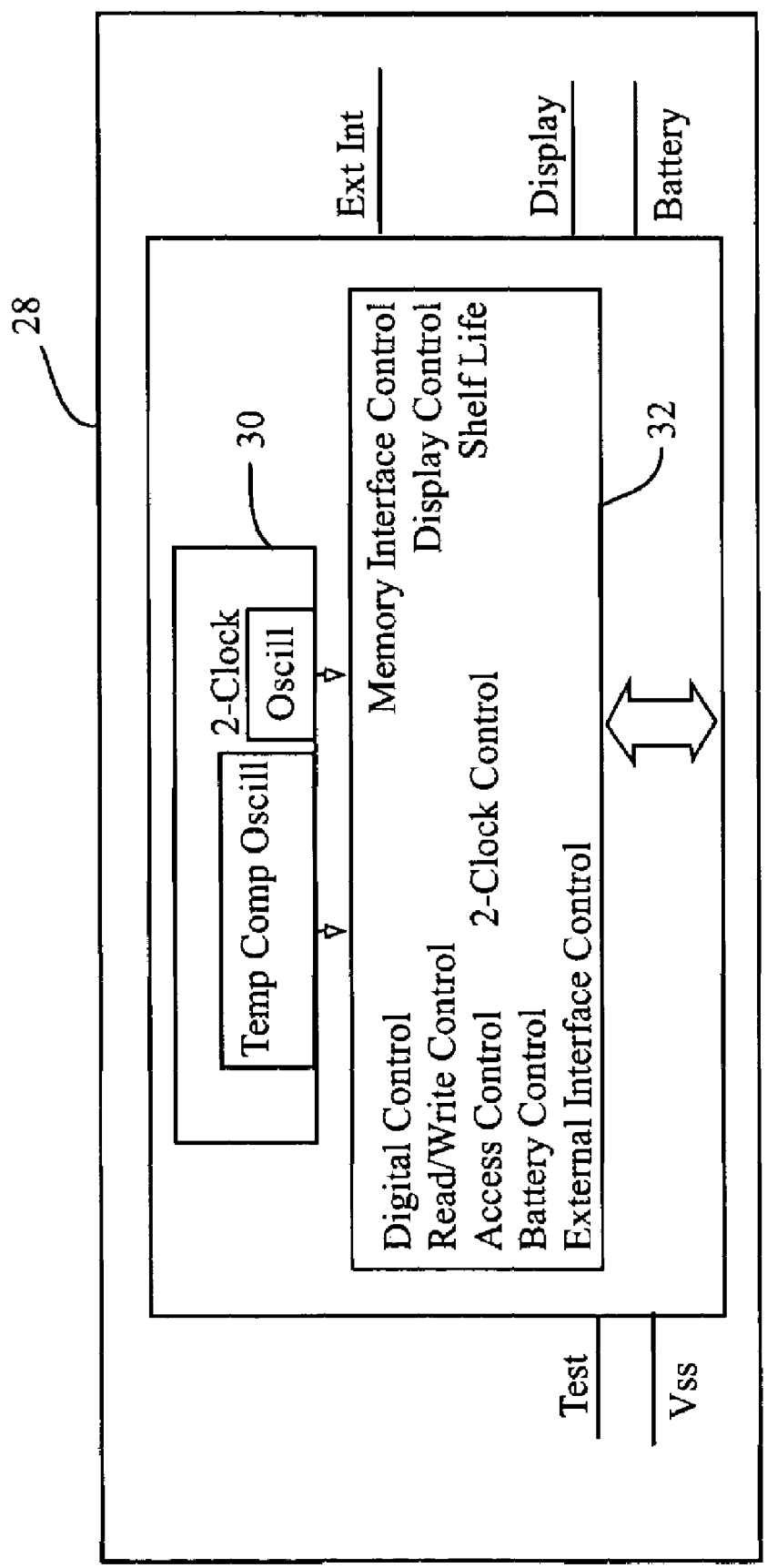
FIG. 9 is a block diagram illustrating programming components of a RF sensor in accordance with a preferred embodiment.

FIGS. 9-12 illustrate chip and memory content configurations in block diagrams of a RFID transponder-sensor system in accordance with preferred embodiments. FIG. 9 illustrates a sensor 28 having a twin oscillator or twin clock system sensor component 30 that measures temperature and time, preferably in accordance with U.S. patent application Ser. No 5,442,669, hereby incorporated by reference, and in accordance with a preferred embodiment. The memory block 32 illustrated at FIG. 9 includes several programming components for controlling various functions of the sensor. The digital control, read/write control and access control programming permit conversion of analog data and access to the data, as well as data updating and downloading. Memory and external internal interface controls permit communication of data via a RFID transponder chip. These also permit the data to be transferred to another tag such as in a mother-daughter tag system that may be used when multiple product bundles are broken up along the supply chain. This feature is advantageous when it is desired to continue monitoring the freshness status of perishable products using past history and present status when products are separated from a pallet or other large supply chain bundles. The programming further includes battery and display controls. The shelf life component includes the tables or calculation formulas for determining current freshness data based on measurement data received periodically from the sensor 30.

Accordingly, an RF-enabled sensor architecture is provided and described herein including one or more discrete sensor(s) and an RF transponder, with these different functions being implemented as modules in an integrated sensor/RF circuit system using the same memory addressing and command structure.

An advantage of the system is its custom-designed I-FRESH integrated circuit. The I-FRESH-IC is designed to be processor-efficient, power-efficient and memory-efficient, yet accurate, customizable and auditable. The same I-FRESH-IC can be used to monitor shelf life of a product with a 14-day life or a 3-year life.

The I-FRESH-IC has been designed first and foremost for shelf life monitoring, although it can be used simply as a temperature monitor. The basis of the design is its twin clocks, one of which is a wild clock and the other which is a temperature-compensated clock. These provide a consistency between time and temperature that is the basis of the accuracy of the chip's shelf life (time-temperature integration) calculation over the life of the product. The clocks run at very slow speed, resulting in power efficiency.

The I-FRESH-IC can be either a state machine or microprocessor. Its primary embodiment is the use of tables to calculate shelf life, although alternatively an expression may be used and calculations may be performed. Preferably, the sensor chip or I-FRESH-IC uses shelf life data provided by the perishable producers for calculating their product's "Use By" or expiration date. This data, expressed in % of shelf life used at each expected temperature, can take into account the effect of the product's packaging. The user can also include high or low temperature thresholds which cannot be exceeded, for example, certain products cannot be frozen or evaporated and conditions under which the user is to be alerted. This data can be input at the fab, distributor, or at the perishable producer. Once loaded into the chip, this data, as well as shelf life calculations and history, can be configured such it either can or cannot be modified, and can be read/write protected if desired.

When started, the chip sensor samples temperature at user-set intervals 24/7 until the end of the product's shelf life. Preferably for food, this sample interval is set at 12 minutes for most items. But other sample rates are possible and configurable depending on product life and desired precision.

In addition, the perishable producer, as well as other users of the tag within the supply chain (for example, shipper, distribution center or retailer), can set alert conditions. Examples of alerts: "ship at 90% shelf life left"; "sell at 50% of shelf life left"; "product is at freezing". Furthermore, history and exception conditions are preferably stored in the chip and can be accessed via an RF reader for printing or saving to a database.

Depending upon battery life, the tag can be reused. Battery options provide for a tag life of up to 10 years, although preferably a service call at twelve reuses or eighteen months is performed to maintain adequate calibration and battery life.

The RFID functionality of the tag may be passive RFID, i.e., communication is initiated and enabled by active RFID reader interrogation of the transponder-sensor system. The tags will support EPC UHF, ISO UHF, ISO HF, ISO LF and/or other RF communication as applicable for communicating sensor data. The perishable producer preferably specifies the RFID standard (EPC, ISO), frequency (UHF, HF, LF) and memory to be used for RFID use for its unique identification number (EPC) and other uses (256, 512, 2048 bits).

Figure 11:
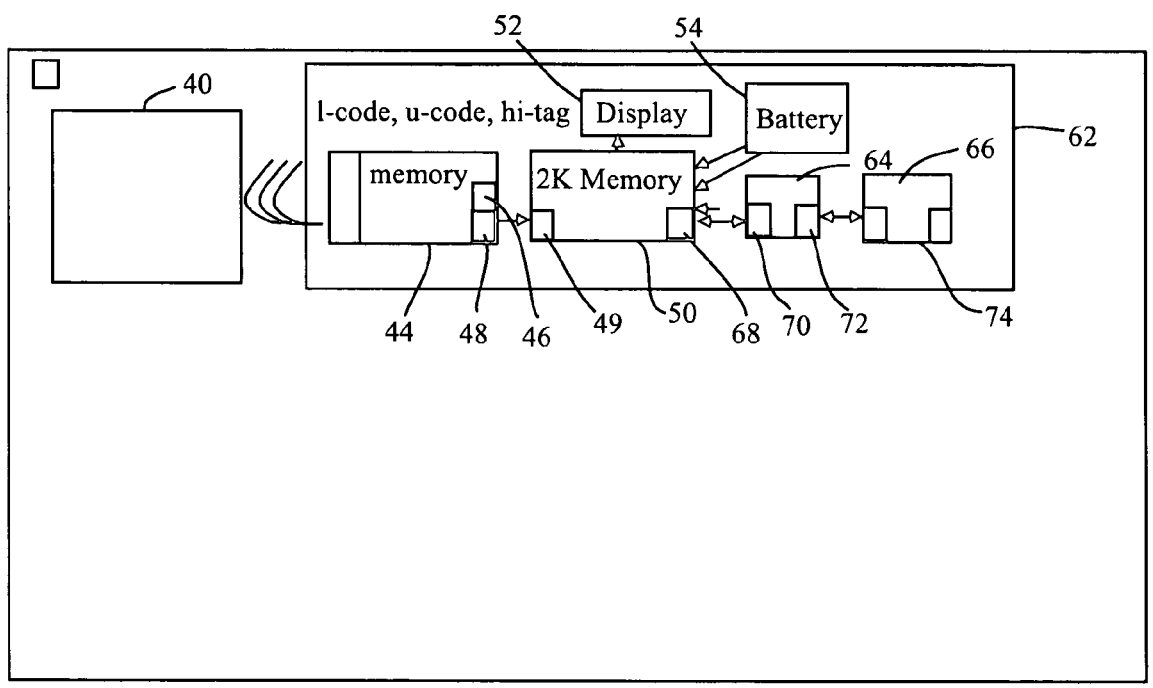
FIG. 11 is a further block diagram illustrating programming components, a modular configuration of memory of a RF sensor coupled together with one or more further sensors in accordance with a preferred embodiment.

An advantage that is illustrated at FIG. 11 is called "inheritance" and is described in more detail below. This feature enables shelf life left from a large container of perishables to be transferred to a tag set up for the same batch/shelf life characteristics. Examples include wine (vat, case, bottle); pharmaceuticals (large container, small container, vial). Inheritance also enables shelf life data to be transferred from a UHF pallet or case tag to an HF item tag. The inheritance feature may also be used for very long life products, wherein a new tag may be used to replace an old tag that may be at the end of its useful life. Although preferably old tags simply have their data transferred to new tags, an old tag can alternatively be refurbished with new programming, a new battery and even a replacement chip.

The I-FRESH-IC supports an optional display 12 with user button. The display is preferably a printable display 12, is flexible and may be configured for tagging applications on bottles or odd shaped items. The display can represent "fresh/not fresh", "fresh/use now/toss", or can be akin to a gas gauge ranging from "fresh" to "empty". Other common options, including red/green LEDs may apply.

The size of the tag, substrate to which the I-FRESH-IC and the antenna 4 are mounted, the battery life and the optional display are preferably configurable components of the tag. Physical tag size is determined mainly by the antenna 4 and battery 8, which in turn may be selected based on desired accessible distances and lifetimes. The antenna 4 uses with UHF EPC can be as large as 4" by 4". HF antennas in contrast are smaller in size and can fit on a 1"×2" tag or on the top of a bottle cap. The battery 8 may include a 14-day, 190-day, 500-day, 3-year or 10-year life. These options include a printable battery (thin and flexible) or a button cell. Choice of battery is dependent upon size and nature of the product to be tagged and the shelf life of the perishable.

The sensor-transponder system is preferably configured in accordance with Windows CE-based PDA readers and shelf/desk mountable readers for short distance reading. Additionally, the preferred tags are compatible to industry-standard ISO an EPC portal readers.

Real-time edgeware software is preferably used for readers and networks. The reader software enables readers to input, output, print and communicate shelf life data, alerts and history. This network software monitors shelf life readers on the network, gathers statistics, checks that the readers are working, provides updates, and manages shelf life data tables. Its web database servers enable those with no supply chain software systems to access shelf life data. It also offers developer toolkits and shelf life fine-tuning software, enables users to manage shipping, manufacturing, inventory and sales by "least shelf life left".

Customized software is preferably utilized to interface to customer proprietary supply chain software systems. Interfaces to leading supply chain software systems such as Savi and SAP may be used, and special interfaces may be used.

Figure 10:
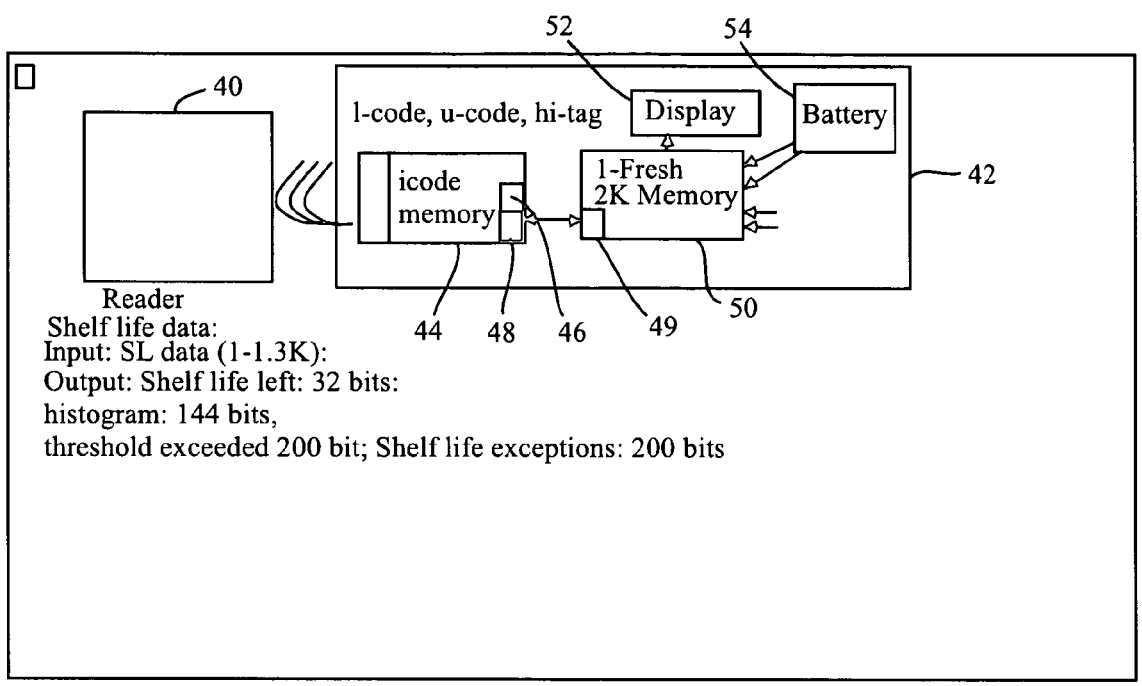
FIG. 10 is a further block diagram illustrating programming components and a modular configuration of memory of a RF sensor in accordance with a preferred embodiment.

FIG. 10 illustrates a RFID reader 40 communicating with a sensor-transponder system 42 in accordance with a preferred embodiment. The sensor-transponder system 42 includes a RFID transponder component 44 that includes a shelf life memory component 46 that is preferably 32 bits. The memory component 46 is accessible by the reader 40 independent of the sensor status, i.e., whether it is asleep or measuring or processing current freshness data. The transponder component 44 includes an interface component 48 for communicating with an corresponding interface 49 of the main sensor memory 50. The display 52 is illustrated as being controlled by the sensor 50, and the battery 54 is illustrated for powering the sensor 50.

Shelf Life and Custody Logs

Over the last twenty years manufacturers, distributors and retailers of perishables have used data loggers to collect temperature data for HACCP documentation and analysis of refrigeration equipment, transportation containers and warehouse air conditioning and refrigeration—flagging when and how long temperature thresholds have been exceeded. At each sensing interval the logger records time of the sensing and temperature—resulting in logger memory commonly ranging in size from 16 K-64 K bytes. When loggers are used to measure environmental conditions in which items are stored rather than used to monitor tagged items, the large accumulation of historical data is not an issue. However, when temperature loggers using RF as their communication interface are used as tags on perishable items, cases or pallets, the amount of data to be sent from the tag to the RF reader and system databases is massive. The amount of data sent from a tag to a reader affects the number of tags that can be read by an RFID reader as tags pass through a warehouse door and the amount of disk storage involved to save the tag's data.

Additionally, in order for the same log to accommodate a variety of perishables, all with different lives (e.g. fish at 14 days, drugs at year or longer, "meals ready to eat" at three years or more and ammunitions at over five years), the logger's memory needs to be large enough so that sensing data is not dropped when memory boundary of the logger is reached.

In accordance with a preferred embodiment, and referring to an exemplary shelf-life table illustrated at Table I, integration of temperature and time into a % of shelf life used per sensing interval results in a number representing shelf life left. As the tagged item passes thru an RF controlled warehouse door, this shelf life left number and any user set alerts quickly communicates the item's condition.

TABLE I

| Custody Change | Location # | Shelf Life Left | Elapsed Time (min) | Min Temp | Max Temp |
|---|---|---|---|---|---|
| Mfg stores | 111111 | 100% | 12 | 9.9 | 9.6 |
| Truck | 222222 | 99% | 36 | 9.2 | 18.7 |
|  |  | 99% | 48 | 5.2 | 18.5 |
| Truck | 222222 | 98% | 156 | 4.5 | 5.0 |
| Mfg DC dock | 333333 | 98% | 160 | 4.7 | 5.2 |
|  |  | 96% | 168 | 4.7 | 33. |
| Mfc DC stores | 333444 | 96% | 168 | 3.3 | 29.9 |
|  |  | 95% | 468 | 1.1 | 29.8 |
|  |  | 94% | 780 | 1.2 | 1.4 |
|  |  | 93% | 1080 | 1.1 | 1.2 |
| Transport | 444444 | 93% | 1090 | 1.0 | 1.3 |
|  |  | 92% | 1320 | 1.2 | 1.4 |
|  |  | 91% | 1500 | 1.1 | 1.3 |
| Alert 2 Be at retail DC |  | 90% | 1680 | 1.4 | 1.2 |
|  |  | 89% | 1860 | 3.3 | 4.8 |
| Transport | 444444 | 89% | 1860 | 5.0 | 5.2 |
| Retail DC Dock | 555555 | 89% | 1862 | 5.1 | 5.3 |
|  |  | 88% | 1956 | 5.0 | 5.3 |
|  |  | 87% | 2136 | 5.1 | 5.3 |
|  |  | 86% | 2316 | 5.2 | 5.3 |
| Retail DC Stores | 555566 | 80% | 1864 | 4.9 | 5.2 |
| Alert 3: sell |  | 75% |  |  |  |

History data is also preferably kept. This includes a histogram of temperatures sensed and a shelf life log. The shelf life log preferably records the elapsed time, the maximum temperature and the minimum temperature for each % change in shelf life. This % change (e.g., 1%, 0.5%, 5.0%) can be specified by the user. For example, if the log is set to log at each 1% change in shelf life, the log table has 100 entries (going from 100% to 1%); no matter what the actual life of the tagged product. When temperature abuse occurs most entries in the logs are at the time of the temperature abuse, e.g., occurring because the temperature abuse causes greater percentage decrease in shelf life left. In an alternative embodiment, a mean kinetic temperature log may be kept instead of or in addition to the shelf life log.

The sensor also logs high and low temperature threshold violations and alert data. The result is exception-based reporting that is applicable not only for temperature sensing but for any sensor data that affects the shelf life of a product, has settable alert conditions or has threshold settings—perishable or non-perishable.

Additionally, the sensor preferably updates its log at each change in custody (from inventory to receiving; from manufacturer to transport to retail distribution center to transport to retailer). Notification for the change of custody is sent from an RF reader to the RF transponder memory and then to the sensor. Custody data sent from the reader includes, at a minimum, the time of the change of custody and the location or reader identification number.

The shelf life % used, temperature threshold violations, alerts and changes in custody data require approximately 512 bytes of log memory. When this data is viewed together on one table/chart, the user gets a quick picture of what happened to the item, case or pallet. This is in contrast to an RF logger with its 16 k to 64 K bytes of temperature data which has to be downloaded to an RF reader, then sent to a computer for analysis.

Inheritance

FIG. 11 illustrates a RFID reader 40 communicating with a further sensor-transponder system 62 in accordance with a further embodiment. There are many further situations in which products are shipped in large containers and throughout the distribution chain are repackaged. The quality of a perishable is affected by the product's temperature history and its perishability curve. Today when batches of pharmaceuticals are split into smaller batches often the "use by" date is lost.

The sensor-transponder 62 includes the components 44, 48, 49, 50, 52 and 54 described previously with respect to the embodiment of FIG. 10. The system 62 includes the further feature that additional smart sensors 64 and 66 are "daisy-chained" together with the system 62. Freshness status data from the memory 50 not only to the RFID reader accessible memory 44, but also to the additional sensors 64 and 66 by interfaces 68, 70, 72 and 74.

Freshness status data, shelf life data including output shelf life data and other programming are contained in and/or are transferred to the additional sensors 64 and 66. The additional sensors 64,66 may be detached from the main sensor 62. The additional sensors 64,66 can then be attached to separated products from a bundle that the main sensor 62 was and may continue to be attached to. The additional sensors 64,66 may be configured only for retaining the freshness status data obtained from the main sensor 62, and may be more completely configured to continue to sense the freshness of the separated products to which they are now attached. The additional sensors may only have a display for providing freshness status, are may be further configured so that the freshness data may be accessed by a RFID reader. The additional sensors 64, 66 may also be re-attached to the same or another main sensor module 62. In this embodiment, the additional sensors 64,66 may preferably utilize the RFID transponder, battery, display and memory capabilities of the main sensor 62, and simply carry and transfer the freshness status data upon re-attachment.

This inheritance feature enables shelf life data to be transferred to another shelf life tag or additional sensors 64, 66. The new tag or additional sensors 64,66 is/are configured with the same shelf life tables or perishable data tables as the main sensor memory 50. Not only is the shelf life left but also an audit trail identifying the EPC number of the mother tag 62 are each preferably transferred to the daughter tag(s) 64, 66. Particular applications include wine and pharmaceuticals.

Figure 12:
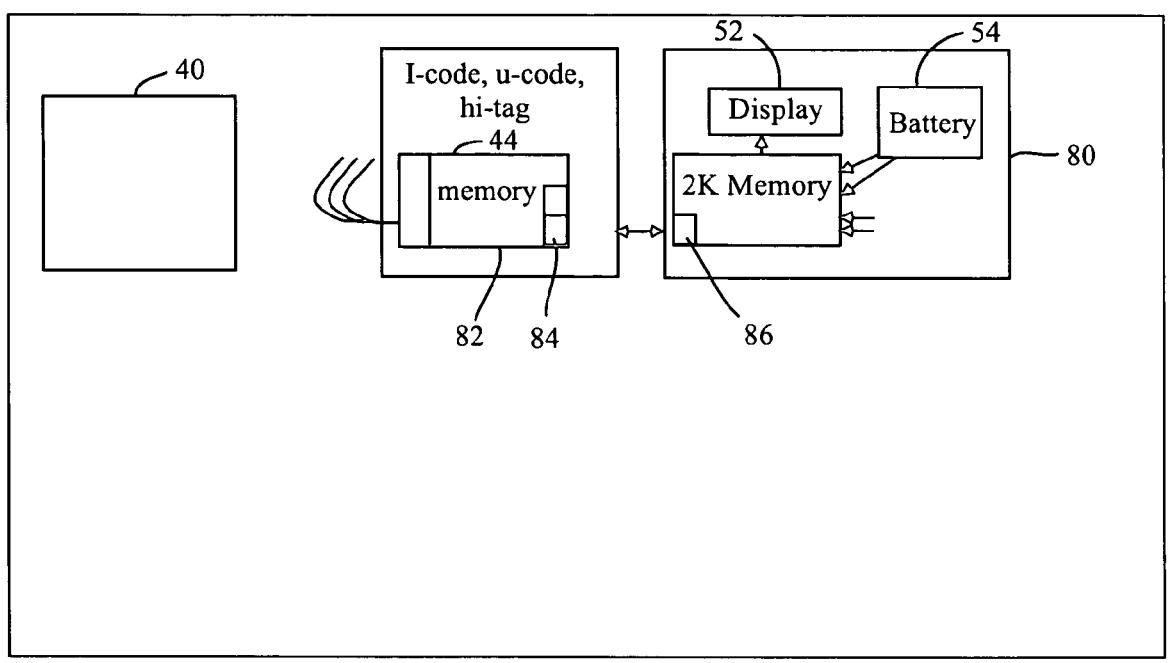
FIG. 12 is a further block diagram that illustrates separate RFID and sensor components that are at least signal coupled together.

FIG. 12 illustrates another embodiment of a sensor-transponder system. In this embodiment, a sensor component 80 and memory component 82 are separate modules that connect and/or communicate via interfaces 84, 86. The sensor component includes the memory 50, display 52 and battery 54, while the memory component 82 includes memory 44 and components for communicating with RFID reader 40.

Another embodiment of the sensor-transponder system is for shelf life data representing % of shelf life left, the time of last shelf life reading, a calculated new expiration date based on the last shelf life and/or estimated time left before use to be communicated to a printed label.

Alternative Embodiments

RF output of digital sensors is an alternative to the more commonly implemented serial interfaces for sensors. A radio frequency or infrared band can be substituted as a communication interface for a one-wire bus for communicating temperature and shelf life (see, e.g., U.S. Pat. No. 6,122,704, hereby incorporated by reference).

A wireless tag may be attached to a product communicating to a reader such as is described at U.S. Pat. No. 6,285,282, hereby incorporated by reference.

A timing module may be included that permits a user, upon interrogating a RFID tag, to determine the precise length of time from the previous charge of the RFID tag and how an environmental sensor can be used in conjunction with timing module (see, e.g., U.S. Pat. No. 6,294,997, hereby incorporated by reference).

Any of various ways may be selected for communication of wireless sensor data and communication to a remote reader. Various ways may be used for interfacing the sensor to a non-sensor RF transponder for the purpose of communicating sensor data to the RF transponder and ultimately to a reader. The RF transponder then communicates the sensor data to an RF reader. For example, European patent EP837412, hereby incorporated by reference, describes memory mapping of special functions like the read out of sensor data.

In addition, a display system and memory architecture and method for displaying images in windows on a video display may be used for displaying freshness status (see e.g., U.S. Pat. Nos. 4,823,108 and 5,847,705, hereby incorporated by reference). Further features may be described at U.S. Pat. Nos. 5,237,669, 5,367,658, 6,003,115, 6,012,057, 6,023,712, 6,476,682, 6,326,892, 5,809,518, 6,160,458, 6,476,716, 4,868,525, 5,963,105, 5,563,928, 5,572,169, 5,802,015, 5,835,553, 4,057,029, 4,277,974, 3,967,579, 6,863,377, 6,860,422, 6,857,566, 6,671,358, 6,116,505, 5,193,056, 6,217,213, 6,112,275, 6,593,845, 6,294,997, 6,720,866, 6,285,282, 6,326,892, 6,275,779, 4,857,893, 6,376,284, 6,351,406, 5,528,222, 5,564,926, 5,963,134, 5,850,187, 6,100,804, 6,025,780, 5,745,036, 5,519,381, 5,430,441, 4,546,241, 4,580,041, 4,388,524, 4,384,288, 5,214,409, 5,640,687, 6,094,138, 6,147,605, 6,006,247, 5,491,482, 5,649,295, 5,963,134, 6,232,870 and 4,746,823, U.S. published patent application No. 2002/0085453, and/or sensor interface spec 1451-4, and/or at the background, invention summary and brief description of the drawings, and are all hereby incorporated by reference.

An independent display may broadcast a RF signal continuously within a perimeter of, e.g., ten feet, for energizing a responsive packaging device that signals back its perishability status. The signal may be a mark along a gas gauge type device or a yes/no LED or OLED or PLED. A single dot may represent the polled package. The independent display may be attached to a counter, a wall, a shelf, a refrigerator, a pallet, etc. This allows a substantial reduction in power and cost in monitoring the shelf life of the package. The display may work in conjunction with other means to selectively poll an individual package. The package may be individually switched on or off to avoid conflicts with other polled responses. The display may search out other indicia to identify the individual package, make a list of such, and append the perishability status to the list.

Shelf life is an integration over multiple temporal periods of a spoilage rate curve that varies as a function of temperature and/or other environmental conditions such as humidity, vibration, direct exposure to contaminants or oxidation, etc. Preferably, as least two clocks, one for measuring time and one for measuring temperature, are used. Tables may be used that take these into consideration, thereby providing a shelf life accuracy that can be tuned for particular products. Shelf life accuracy is thereby provided over the life of the perishable within advantageously 1% in critical ranges. This accuracy is dependent upon the consistency of the clocks. Tables may be calibrated and loaded with just clock tick data (representing temperature), to provide a temperature monitor.

Life left in the battery may be determined based upon a number of shelf life samples. For example, log RF may read and display hits. This may be advantageous for determining battery status. At the end of a shelf life, a tag may go dormant, so that as to battery life, the tags may be reused with the remaining battery life that was saved due to the tag going dormant when the shell life has expired. The shelf life left may be represented as a percentage of shelf life. This may be kept in the chip very accurately, yet may be a smaller percentage when sent to a reader for alert purposes. The tag may be effectively an exception reporter, and as such may provide alerts and pinpointing of exceptions.

The tag may be an item tag for foods and pharmaceuticals, among other perishable items. Reference data that enables an audit trail may be provided in the tag. Once the tag is started, preferably no data (shelf life, use by alert, history and shelf life left) is to be changed by a user, although alternatively, a tag may be configurable as desired under certain circumstances. A reason not to permit modification of data is that inheritance of data (especially for beyond use dates) may provide audit trail ability. The preferred embodiment includes a smart sensor with RFID interface. Memory for shelf life data and history is preferably separate from RFID memory. Interfacing is preferably via a sensor bus to RFID chip. This enables interfacing to multiple vendor RFID implementations and multiple RF frequencies.

A "command-driven" architecture or a "memory map" may be used. Data sizes of different fields may be defined. A sample size may be 14 bits. Sampling may occur every 12 minutes or longer, and a lifetime may be five years or more. RFID readers may be provided with the software that recognizes RFID tags. A real time middleware or betweenware solution may interpret the data and may be able to print the data.

A table may be used wherein preferably less than 2 k bits of memory uses an advantageous communications protocol arrangement. Either of EPC/UHF Class1V2—256 bits of memory AND ISO HF I-Code may be used. Philips ISO U-Code HSL, ISO U-Code EPC 1.19, EPC Class 1 Gen2 or ISO I-Code chip may be used. The Software may be implemented in chip and with RFID reader A 32 bit memory block of which 8 bits represents a command and 24 bits data may be used. There may be no READ/WRITE command in chip so the reader may write to the chip to tell it what it wants next. Memory addresses may be used over 8 k that the chip is not using, e.g., the number of addresses may be 128. The reader may, in this case, just read blocks of memory that are assigned address numbers to data in tag. Often an address will include only 8 bits. For either of these options, the memory layout for the design may be 32 bits on the tag or less. A Quick Alert area may be updated after each temperature sensing. It may include a command name in the case of the 8 bit command/24 bit data option. Data may be input into chip at either assembly of the tag or at the perishable producer.

Exemplary data sizes are provided as follows:

Clock tick data=384 bits (16 bits; 24 table entries)

Delta (shelf life data)=384 bits (16 bits, 24 table entries)

Unique identifier=assumed most on wafer; serial number (64 bits); could be on wafer.

An EPC number (optional) for use by perishable producer for inheritance or on standalone tags to identify perishable=96 bits Device configuration data=about 128 bits
Histogram data=320 bits
Shelf life and custody logs=512 bytes Maintaining the clock tick count for the sensing has enhanced applicability to products that are frozen. The ability to set duration of sensing interval is advantageous in this regard. Clock tick count may be 370; and a clock tick of around 500 may be used to improve accuracy over a broad range of products, and a clock tick of 2500 further improves accuracy.

While an exemplary drawings and specific embodiments of the present invention are described and illustrated above and below herein, it is to be understood that that the scope of the present invention is not to be limited to the particular embodiments disclosed. Thus, the embodiments shall be regarded as illustrative rather than restrictive, and it should be understood that variations may be made in those embodiments by workers skilled in the arts without departing from the scope of the present invention as provided in the claims and structural and functional equivalents thereof.

In addition, in methods that may be performed according to preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

What is claimed is:

1. A method for efficiently monitoring perishable integrity over multiple segments of a product supply chain, comprising:
   (a) providing a perishable integrity indicator system that comprises:
      (i) a RFID transponder including a RFID integrated circuit coupled with an antenna;
      (ii) a perishable integrity sensor that monitors the time and temperature of the perishable;
      (iii) a freshness determining module for receiving time- and temperature-dependent measurement data from the perishable integrity sensor and determining a current freshness status;
      (iv) a communications interface to the RFID transponder permitting a RFID reader to retrieve current freshness status data corresponding to the freshness status determined by the freshness determining module; and
      (v) a power management module; and
   (b) transferring the freshness status data to a second perishable integrity indicator system.

2. The method of claim 1, wherein the transferring comprises uploading from the first RFID system to a RFID reader memory and downloading to the second integrity indicator system.

3. The method of claim 1, wherein the transferring is by direct connection of the first and second integrity indicator systems via the first or the second communication interface.

4. The method of claim 1, wherein the second integrity indicator system comprises a RFID-configured system.

5. The method of claim 4, wherein the transferring comprises uploading from the first RFID system to a RFID reader memory and downloading to the second RFID integrity indicator system from the RFID reader.

6. A system for monitoring perishable integrity over multiple segments of product supply chain, comprising:
   (a) a first perishable integrity indicator system that comprises:
      (i) a RFID transponder including a RFID integrated circuit coupled with an antenna;
      (ii) a perishable integrity sensor that monitors the time and temperature of the perishable;
      (iii) a freshness determining module for receiving time- and temperature-dependent measurement data from the perishable integrity sensor and determining a current freshness status;
      (iv) a communications interface to the RFID transponder permitting a RFID reader to retrieve current freshness status data corresponding to the freshness status determined by the freshness determining module; and
      (v) a power management module; and
   (b) a second perishable integrity indicator system configured for transferring the freshness status data from the first perishable indicator system to the second perishable indicator system.

7. The system of claim 6, wherein the power management module periodically wakes up the freshness monitoring component from a sleep or other low power state to gather the sensor measurements.

8. The system of claim 6, wherein the memory comprises a RFID transponder portion for controlling the RFID transponder, and a dedicated sensor data portion comprising the freshness status data or special commands for retrieving the freshness data, or a combination thereof, and configured such that the freshness status data is directly accessible by the RFID reader without disturbing the sensor.

9. The system of claim 6, wherein a current freshness status is determined based on application of the measurement data to one or more predetermined temperature-dependent shelf-life trends stored in the memory.

10. The system of claim 6, wherein the second RFID indicator system is attachable to and detachable from the first RFID indicator system.

11. The system of claim 6, wherein the data are transferable to the second RFID integrity indicator system by uploading from the first RFID system to a RFID reader memory and downloading to the second integrity indicator system.

12. The system of claim 6, wherein the data are transferable by direct connection between the first and second integrity indicator systems via the first or the second communication interface.

13. The system of claim 6, wherein the second integrity indicator system comprises a RFID-configured system.

14. The system of claim 13, wherein the transferring of the data comprises uploading from the first RFID system to a RFID reader memory and downloading to the second RFID integrity indicator system from the RFID reader.

15. A perishable integrity indicator system, comprising:
   (a) a RFID transponder including a RFID integrated circuit coupled with an antenna;
   (b) a perishable integrity sensor that monitors the time and temperature of the perishable;
   (c) a memory module containing data representing one or more predefined temperature- dependent shelf-life trends;
   (d) a freshness determining module for receiving time- and temperature-dependent measurement data from the perishable integrity sensor and determining a current freshness status by applying the measurement data to the trend data from the memory module;
   (e) a communications interface to the RFID transponder permitting a RFID reader to retrieve current freshness status data corresponding to the freshness status determined by the freshness determining module;
   (f) a power management module; and
   (g) a security component configured to provide selective access to the freshness status data.

16. The system of claim 15, wherein the freshness monitoring module provides summary freshness information, or an alert when the freshness status data differs by a predetermined amount, or when a perishable is determined to be approaching an expected end of its shelf life, or combinations thereof.

17. The system of claim 15, wherein the freshness status data comprises integrations of temperature measurements over time.

18. The system of claim 15, wherein the one or more predetermined trends are provided in one or more data tables or equations or both.

19. The system of claim 18, wherein at least one of the trends comprises an exponential decay component.

20. The system of claim 18, wherein at least one of the trends comprises a linear component.

21. The system of claim 18, wherein at least one of the trends is customizable to expected temperatures over a perishable product's shelf life.

22. The system of claim 15, wherein the freshness status comprises a shelf life log that tracks time at fractions of shelf life lost.

23. The system of claim 15, wherein the freshness status comprises a custody log that tracks information relating to multiple custody periods over a perishable product's shelf life.

24. The system of claim 15, wherein said RFID transponder and said sensor comprise modules of a single integrated circuit.

25. The system of claim 15, wherein the RFID transponder and sensor are physically separate components and wherein communication interface comprises a one wire serial interface.

26. The system of claim 15, wherein the RFID transponder and sensor are physically separate components and the communication interface comprises a two wire serial interface.

27. The system of claim 15, wherein the RFID transponder and sensor are physically separate components and the communication interface connects the sensor to the antenna of the RFID transponder.

28. The system of claim 15, wherein the memory module further comprises one or more tables or calculations, or both, for determining and updating the freshness status data.

29. The system of claim 15, further comprising a display for providing visual freshness status information to a human observer.

30. The system of claim 15, wherein the freshness monitoring module compares the freshness status data to one or more predetermined trends, and provides an alert when they differ by a predetermined amount, or when a perishable is determined to be approaching an expected end of its shelf life, or both.

31. The system of claim 15, wherein the sensor further includes a humidity-dependent freshness monitoring component, and wherein the freshness monitoring module further receives humidity-dependent measurement data from the freshness monitoring component, determines a current freshness status based at least in part on the humidity- dependent data, and accordingly updates the freshness status data.

32. The system of claim 15, wherein current freshness status is determined based on a comparison of the measurement data with one or more pre-stored shelf life data tables or a fit to an equation or both.

33. The system of claim 15, wherein the sensor is configured to wake up in response to a RFID reader's wake command relayed by the RFID transponder.

34. A perishable integrity indicator system, comprising:
   (a) a RFID transponder including a RFID integrated circuit coupled with an antenna;
   (b) a perishable integrity sensor that monitors the time and temperature of the perishable;
   (c) a memory module containing data representing one or more predefined temperature- dependent shelf-life trends;
   (d) a freshness determining module for receiving time- and temperature-dependent measurement data from the perishable integrity sensor and determining a current freshness status by applying the measurement data to the trend data from the memory module, said freshness determining module including a first substantially temperature-independent clock and a second temperature-dependent clock, and wherein the measurement data includes first and second signals received from the first and second clocks, respectively;
   (e) a communications interface to the RFID transponder permitting a RFID reader to retrieve current freshness status data corresponding to the freshness status determined by the freshness determining module; and
   (f) a power management module.

35. The system of claim 34, wherein the freshness monitoring module provides summary freshness information, or an alert when the freshness status data differs by a predetermined amount, or when a perishable is determined to be approaching an expected end of its shelf life, or combinations thereof.

36. The system of claim 34, wherein the freshness status data comprises integrations of temperature measurements over time.

37. The system of claim 34, wherein the one or more predetermined trends are provided in one or more data tables or equations or both.

38. The system of claim 37, wherein at least one of the trends comprises an exponential decay component.

39. The system of claim 37, wherein at least one of the trends comprises a linear component.

40. The system of claim 37, wherein at least one of the trends is customizable to expected temperatures over a perishable product's shelf life.

41. The system of claim 34, wherein the freshness status comprises a shelf life log that tracks time at fractions of shelf life lost.

42. The system of claim 34, wherein the freshness status comprises a custody log that tracks information relating to multiple custody periods over a perishable product's shelf life.

43. The system of claim 34, wherein said RFID transponder and said sensor comprise modules of a single integrated circuit.

44. The system of claim 34, wherein the RFID transponder and sensor are physically separate components and wherein communication interface comprises a one wire serial interface.

45. The system of claim 34, wherein the RFID transponder and sensor are physically separate components and the communication interface comprises a two wire serial interface.

46. The system of claim 34, wherein the RFID transponder and sensor are physically separate components the communication interface connects the sensor to the antenna of the RFID transponder.

47. The system of claim 34, wherein the memory module further comprises one or more tables or calculations, or both, for determining and updating the freshness status data.

48. The system of claim 34, further comprising a display for providing visual freshness status information to a human observer.

49. The system of claim 34, wherein the freshness monitoring module compares the freshness status data to one or more predetermined trends, and provides an alert when they differ by a predetermined amount, or when a perishable is determined to be approaching an expected end of its shelf life, or both.

50. The system of claim 34, wherein the sensor further includes a humidity-dependent freshness monitoring component, and wherein the freshness monitoring module further receives humidity-dependent measurement data from the freshness monitoring component, determines a current freshness status based at least in part on the humidity- dependent data, and accordingly updates the freshness status data.

51. The system of claim 34, wherein current freshness status is determined based on a comparison of the measurement data with one or more pre-stored shelf life data tables or a fit to an equation or both.

52. The system of claim 34, wherein the sensor is configured to wake up in response to a RFID reader's wake command relayed by the RFID transponder.

53. The system of claim 34 further comprising a security component configured to provide selective access to the freshness status data.

54. A perishable integrity indicator system, comprising:
(a) a RFID transponder including a RFID integrated circuit coupled with an antenna;
(b) a perishable integrity sensor that monitors the time and temperature of the perishable;
(c) a freshness determining module for receiving time- and temperature-dependent measurement data from the perishable integrity sensor and determining a current freshness status;
(d) a communications interface to the RFID transponder permitting a RFID reader to retrieve current freshness status data corresponding to the freshness status determined by the freshness determining module;
(e) a power management module for periodically waking up the freshness monitoring component from a sleep or other low power state to gather the sensor measurements;
(f) one or more additional perishable integrity sensors also communicatively coupled with said RFID transponder permitting the same or a different RFID reader, or both, to retrieve perishable data measured by the one or more additional sensors; and a security component configured to provide selective access to the freshness status data.

55. A perishable integrity indicator system, comprising:
(a) a RFID transponder including a RFID integrated circuit coupled with an antenna;
(b) a perishable integrity sensor that monitors the time and temperature of the perishable;
(c) a freshness determining module for receiving time- and temperature-dependent measurement data from the perishable integrity sensor and determining a current freshness status;
(d) a communications interface to the RFID transponder permitting a RFID reader to retrieve current freshness status data corresponding to the freshness status determined by the freshness determining module;
(e) a power management module for periodically waking up the freshness monitoring component from a sleep or other low power state to gather the sensor measurements; and
(f) one or more additional perishable integrity sensors also communicatively coupled with said RFID transponder permitting the same or a different RFID reader, or both, to retrieve perishable data measured by the one or more additional sensors;
wherein the time- and temperature-dependent freshness monitoring component comprises a first substantially temperature-independent clock and a second temperature-dependent clock, wherein the measurement data comprises first and second signals received from the first and second clocks, respectively.

56. A perishable integrity indicator system, comprising:
(a) a RFID transponder including a RFID integrated circuit coupled with an antenna;
(b) a perishable integrity sensor that monitors the time and temperature of the perishable;
(c) a freshness determining module for receiving time- and temperature-dependent measurement data from the perishable integrity sensor and determining a current freshness status;
(d) a communications interface to the RFID transponder permitting a RFID reader to retrieve current freshness status data corresponding to the freshness status determined by the freshness determining module;
(e) a power management module for periodically waking up the freshness monitoring component from a sleep or other low power state to gather the sensor measurements; and
(f) memory for storing freshness status data including a security component to provide selective access to the memory.

57. The system of claim 56, wherein the freshness determining module comprises one or more tables or calculations, or both, for determining and updating the freshness status data.

58. The system of claim 56, further comprising a display for providing visual freshness status information to a human observer.

59. The system of claim 56, wherein the freshness determining module compares the freshness status data to one or more predetermined trends, and provides summary information, or an alert when the data differs by a predetermined amount from a trend or when a perishable is determined to be approaching an expected end of its shelf life, or combinations thereof.

60. The system of claim 56, wherein the sensor further includes a humidity-dependent freshness monitoring component, and wherein the freshness monitoring module further receives humidity-dependent measurement data from the freshness monitoring component, determines a current freshness status based at least in part on the humidity- dependent data, and accordingly updates the freshness status data.

61. The system of claim 56, wherein the time- and temperature-dependent freshness monitoring component comprises a first substantially temperature-independent clock and a second temperature-dependent clock, wherein the measurement data comprises first and second signals received from the first and second clocks, respectively.

62. The system of claim 56, wherein current freshness status is determined based on a comparison of the measurement data with one or more pre-stored shelf life data tables or a fit to an equation or both.

63. The system of claim 56, wherein the sensor is configured to wake up in response to a RFID reader's wake command relayed by the RFID transponder.

64. The system of claim 56, wherein the freshness status data is retrievable while the freshness monitoring component is in the sleep or other low power state.

65. The system of claim 64, wherein the memory comprises sensor memory.

66. The system of claim 64, wherein the memory comprises transponder memory.

67. A perishable integrity indicator system, comprising:
(a) a RFID transponder including a RFID integrated circuit coupled with an antenna;
(b) a perishable integrity sensor that monitors the time and temperature of the perishable;
(c) a freshness determining module for receiving time- and temperature-dependent measurement data from the perishable integrity sensor and determining a current freshness status, including a first substantially temperature-independent clock and a second temperature-dependent clock, wherein the measurement data comprises first and second signals received from the first and second clocks, respectively;
(d) a communications interface to the RFID transponder permitting a RFID reader to retrieve current freshness status data corresponding to the freshness status determined by the freshness determining module; and
(e) a power management module for periodically waking up the freshness monitoring component from a sleep or other low power state to gather the sensor measurements.

68. The system of claim 67, wherein the freshness determining module comprises one or more tables or calculations, or both, for determining and updating the freshness status data.

69. The system of claim 67, further comprising a display for providing visual freshness status information to a human observer.

70. The system of claim 67, wherein the freshness determining module compares the freshness status data to one or more predetermined trends, and provides summary information, or an alert when the data differs by a predetermined amount from a trend or when a perishable is determined to be approaching an expected end of its shelf life, or combinations thereof.

71. The system of claim 67, wherein the sensor further includes a humidity-dependent freshness monitoring component, and wherein the freshness monitoring module further receives humidity-dependent measurement data from the freshness monitoring component, determines a current freshness status based at least in part on the humidity-dependent data, and accordingly updates the freshness status data.

72. The system of claim 67, wherein current freshness status is determined based on a comparison of the measurement data with one or more pre-stored shelf life data tables or a fit to an equation or both.

73. The system of claim 67, wherein the sensor is configured to wake up in response to a RFID reader's wake command relayed by the RFID transponder.

74. The system of claim 67, wherein the freshness status data is retrievable while the freshness monitoring component is in the sleep or other low power state.

75. The system of claim 74, wherein the freshness status data is stored in sensor memory.

76. The system of claim 74, wherein the freshness status data is stored in transponder memory.

77. A perishable integrity indicator system that comprises:
(a) a RFID transponder including a RFID integrated circuit coupled with an antenna;
(b) a perishable integrity sensor that monitors the time and temperature of the perishable;
(c) a freshness determining module for receiving time-and temperature-dependent measurement data from the perishable integrity sensor and determining a current freshness status;
(d) a communications interface to the RFID transponder permitting a RFID reader to retrieve current freshness status data corresponding to the freshness status determined by the freshness determining module and to download freshness status data to the perishable integrity indicator system from a second integrity integrator system; and
(e) a power management module,
(f) wherein the freshness status data comprises a custody log that tracks information relating to multiple custody periods over a perishable product's shelf life.

78. The system of claim 77, wherein the freshness status data comprises a shelf life log that tracks time at fractions of shelf life lost.

* * * * *